United States Patent
Guo et al.

(10) Patent No.: US 10,594,926 B2
(45) Date of Patent: Mar. 17, 2020

(54) PREFERRED PICTURE TAKING

(71) Applicant: International Business Machines Corporation, Armonk, NY (US)

(72) Inventors: Shang Qing Guo, Yorktown Heights, NY (US); Jonathan Lenchner, Yorktown Heights, NY (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 15/415,262

(22) Filed: Jan. 25, 2017

(65) Prior Publication Data

US 2018/0213145 A1 Jul. 26, 2018

(51) Int. Cl.
*H04N 5/232* (2006.01)
*G06K 9/00* (2006.01)

(52) U.S. Cl.
CPC ..... *H04N 5/23222* (2013.01); *G06K 9/00664* (2013.01); *H04N 5/23206* (2013.01)

(58) Field of Classification Search
None
See application file for complete search history.

(56) References Cited

U.S. PATENT DOCUMENTS

| | | | |
|---|---|---|---|
| 5,227,835 A | 7/1993 | Anagnostopoulos | |
| 6,301,440 B1 * | 10/2001 | Bolle | G06K 9/00664 |
| | | | 348/229.1 |
| 8,508,622 B1 * | 8/2013 | Anon | H04N 5/2621 |
| | | | 348/222.1 |
| 2001/0048815 A1 * | 12/2001 | Nakajima | G03B 17/24 |
| | | | 396/310 |
| 2008/0298795 A1 | 12/2008 | Kuberka et al. | |
| 2009/0231457 A1 * | 9/2009 | Lee | H04N 5/23219 |
| | | | 348/222.1 |
| 2009/0284621 A1 * | 11/2009 | Oks | H04N 5/23222 |
| | | | 348/231.6 |
| 2012/0242796 A1 * | 9/2012 | Ciurea | H04N 5/232 |
| | | | 348/46 |
| 2013/0050507 A1 * | 2/2013 | Syed | H04N 1/00137 |
| | | | 348/207.1 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Twyler L Haskins
*Assistant Examiner* — Wesley J Chiu
(74) *Attorney, Agent, or Firm* — Kevin M. Jordan, Esq.; McGinn IP Law Group, PLLC

(57) ABSTRACT

A computer-implemented preferred picture-taking method, system, and computer program product that learns from the photos taken in the same camera or other sources to know the pictures the camera owner likes, and generates associated templates, imports/exports the templates among cameras, other devices and media, automatically takes a photo when the target person in the camera view matches with the owner's personal preferences (a selected template), and analyzes images in the template and the current view in the camera, calculates the delta, and generates position and orientation adjustment actions in space.

8 Claims, 4 Drawing Sheets

(56) References Cited

U.S. PATENT DOCUMENTS

| | | | |
|---|---|---|---|
| 2013/0155280 A1* | 6/2013 | Donatelli | H04N 5/23293 348/231.99 |
| 2014/0232920 A1* | 8/2014 | Kim | H04N 5/23219 348/333.02 |
| 2017/0237898 A1* | 8/2017 | Lee | H04N 5/23293 348/222.1 |
| 2018/0097990 A1* | 4/2018 | Jayaraj | H04N 5/23222 |

* cited by examiner

PREFERRED PICTURE TAKING METHOD 100

PREFERRED PICTURE TAKING

BACKGROUND

The present invention relates generally to a picture-taking, and more particularly, but not by way of limitation, to a system, computer program product and computer-implemented method for assisting in the taking of desirable photographs.

SUMMARY

In an exemplary embodiment, the present invention provides a computer-implemented method, which includes: identifying one or more photographic templates based on a plurality of factors; matching a current photographic scene of a picture to be taken with at least one of the photographic templates, and providing instructions to adjust the current photographic scene such that the current photographic scene will match a selected photographic template.

One or more other exemplary embodiments include a computer program product and a system.

The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
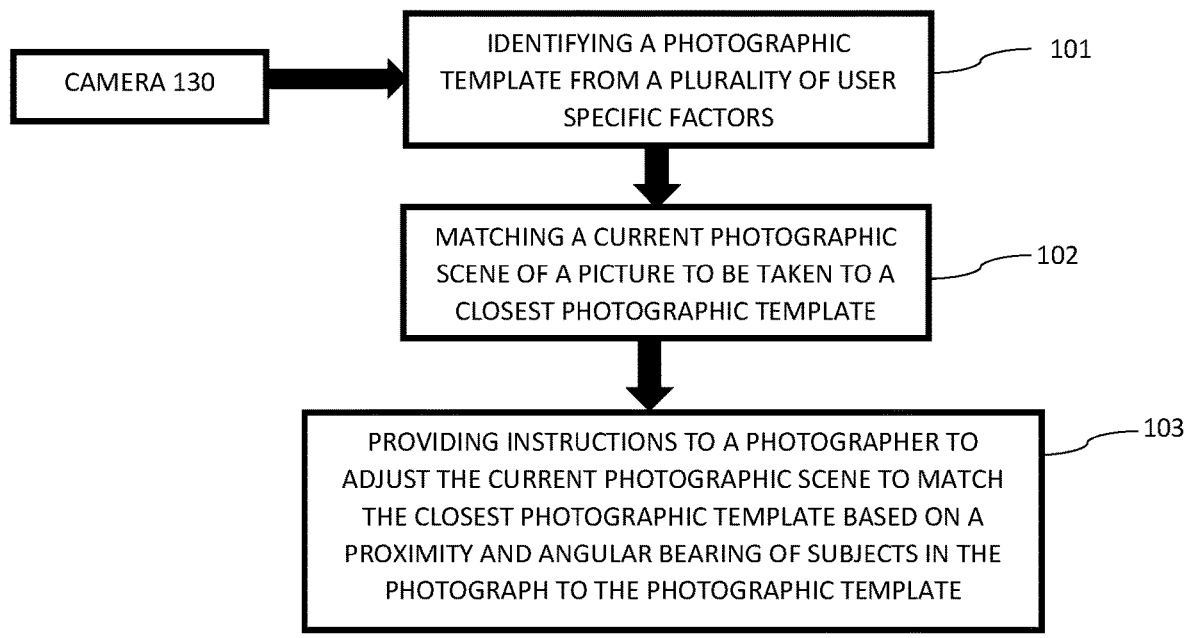
FIG. 1 depicts a high-level flow chart for a computer-implemented method of picture-taking, according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a preferred picture-taking method 100 according to an embodiment of the present invention includes various steps for a user to take in order to match a template to a photographic scene. As depicted, in step 101, a photographic template is identified based on a plurality of factors. In some embodiments, the factors are user-specific and in some embodiments the template is identified based on the types of photographs that the user has indicated he or she likes to take. The template includes a set of features in a picture including composition, position/orientation, focus, aperture, lens, shutter speed, dimensions and size, etc. In some embodiments, the template includes a set of features of pictures that the user has previously taken, has previously liked, and/or are from a database of pre-loaded template(s) of which the user would like to have future pictures that are taken be similar to the template(s). For example, a user may like to take their pictures with the left side of their face facing forward instead of the right side of their face facing forward. The template would include a position and orientation of a user that has the left side of their face facing forward.

The identified photographic template can be learned from past activity of the user. For example, the template can be learned from the past to know what kind of photographs the camera owner likes by analyzing the photos that have been taken and kept (or prioritizes photos posted to social media from their camera roll). The photographs are categorized and features can be extracted to generate templates. In some embodiments, the templates can be extracted based on photographs that the user has liked on social media. For example, common features may be extracted from a plurality of photographs on Instagram™ that the user has liked (favorited) to generate the templates. Similarly, the templates can be extracted from photographs that the user themselves has uploaded to social media.

In some embodiments, the user can import pictures that are from other sources such as books/magazines, web sites, hard/soft copies of pictures, to generate templates or import templates from other cameras.

In other embodiments, the identified template can be based on a combination of any of the above embodiments (e.g., a plurality of user factors). That is, the photographic template is an extracted template that indicates a most likely type of photograph that the user will like.

In step 102, a current photographic scene of a picture to be taken is matched with at least one photographic template out of the identified photographic template(s). When taking a picture, the user can either tell the system which type of template to apply (e.g., a glamour shot template, a professional look template, a group photo template, etc.) or the template can be automatically picked that is a closest match with the current photographic scene of the picture being taken.

For example, if the current photographic scene is that of a mountain in the background with the user in the foreground, a template in which has a similar relationship between a background terrain and the user in the foreground is matched with the current photographic scene such that the differences can be identified (e.g., as described later).

The closest template can be selected by, for example, detecting how many human subjects are in the field of view and determining an approximate distance to background scenery and gauge whether background scenery is important to photograph such as by identifying whether background scenery contains a recognizable item of interest (i.e., a mountain, valley, ocean, etc.). Then, any template that is a good match based on these features, can be further analyzed to determine how close in size and facial orientation each of the subjects is to the subjects in each candidate template. The process can be performed by, for example, matching feature vectors. The closest matching feature vectors yield a closest matching template.

In step 103, instructions are provided to a photographer and/or a user (or to a computer system controlling a tripod or camera 130) to adjust the current photographic scene to match the closest photographic template based on a proximity and angular bearing of subjects in the photograph to the photographic template. In other words, once the closest template is matched with the current photographic scene, the template is compared with the target in the camera view and then the system/camera verbally instructs the subject(s), the camera holder or both to move or instructs the user to change the photographic scenery until certain criteria of the template are met (i.e., by calculating the difference between the current scene and the template). Then, the camera takes a picture.

In some embodiments, if the current photographic scene has the user with their face turned to the right and the photographic template has the user with their face turned to the left, instructions are provided for the user to change the orientation of their face to be turned to the left. That is, the photographic template has the user oriented such that the left side of their face is towards the camera. The delta (i.e., difference) between the camera views (e.g., the current photographic scene) and the template are calculated and the target is provided instructions 203 such that their pose matches the desired pose of the template (e.g., first "turn right a little bit", then "turn right a little more", and finally "good"!). The instructions can be verbally given from the camera 130. However, the instructions can be automatically performed if the delta (i.e., difference) between the template and the current view can be fixed by a camera function (e.g., zoom, pan, etc.). Alternatively, if the camera 130 is provided in a movable setting (such as on a fly-by-wire such as on a movie set), the camera 130 can perform physical displacements of the camera 130 such that the user is oriented correctly to the camera.

In some embodiments, photographs can automatically be deleted if the taken photograph does not match the template or if the photograph is out of focus, contains an unwanted target, has bad lighting, has poor composition, etc.

In one exemplary embodiment, the photographic template can be a full face, ⅔ view, ¾ view, a profile view, a high angle (above eye level), a low angle (below eye or even chin level) and the user is using a tripod to take the self-portrait photograph. The user puts the camera on a tripod and selects ⅔ view. When the user starts to appear in front of the camera and be shown in the camera view, an audible instruction can be emitted from the tripod for the target person to move to a better position by saying "go left a little more, more . . . , turn right a little more, ok, good." or instructs the target person to adjust the tripod itself by saying "raise the tripod up by 2 inches . . . ". Accordingly, the user can take self-portraits using a tripod in which the photograph is to the user's liking based on the templates. Typically, the user is the owner of the camera but not necessarily. That is, the main person in the image can be identified and their template(s) can be used via the cloud (or the like).

Thus, steps 101-103 facilitate the taking of preferred pictures. By way of example only, a preferred picture can be based on templates/factors indicating a user's liking of a particular "composition" of the picture. In some embodiments, the template can be selected manually or with the assistance of the inventive features embodied in the camera e.g., by evaluating the difference between the current photographic scene and the template, instructing the user to perform actions to match the template, and then taking the picture.

In some embodiments, a computer-implemented method in accordance with the example depicted in steps 101-103 can learn from previous photos taken with the same camera (or from other sources), those pictures that the camera owner likes. Templates can be generated, imported and/or exported from and to cameras, other devices and media to automatically take a photo when the subject in the camera view matches one or more factors/preferences (embodied in a selected template). The image in the template and the current view in the camera can be analyzed and compares to calculate the delta between the template and the current photographic scene, and generate position and orientation adjustment actions in three-dimensional space. The instructions can be used to verbally instruct the subject to change their position and reorient themselves and/or modify the camera position (e.g., mounted on a tri-pod) until the image is within a tolerated range of a given template image.

A preferred picture-taking method 100 according to some embodiments of the present invention may act in a more sophisticated and useful fashion, and in a cognitive manner while giving the impression of cognitive mental abilities and processes related to knowledge, attention, memory, judgment and evaluation, reasoning, and advanced computation. For example, a system/method may be considered "cognitive" if it possesses macro-scale properties—perception, goal-oriented behavior, learning/memory and action—that characterize systems (i.e., humans) that are generally agreed as cognitive.

Figure 2:
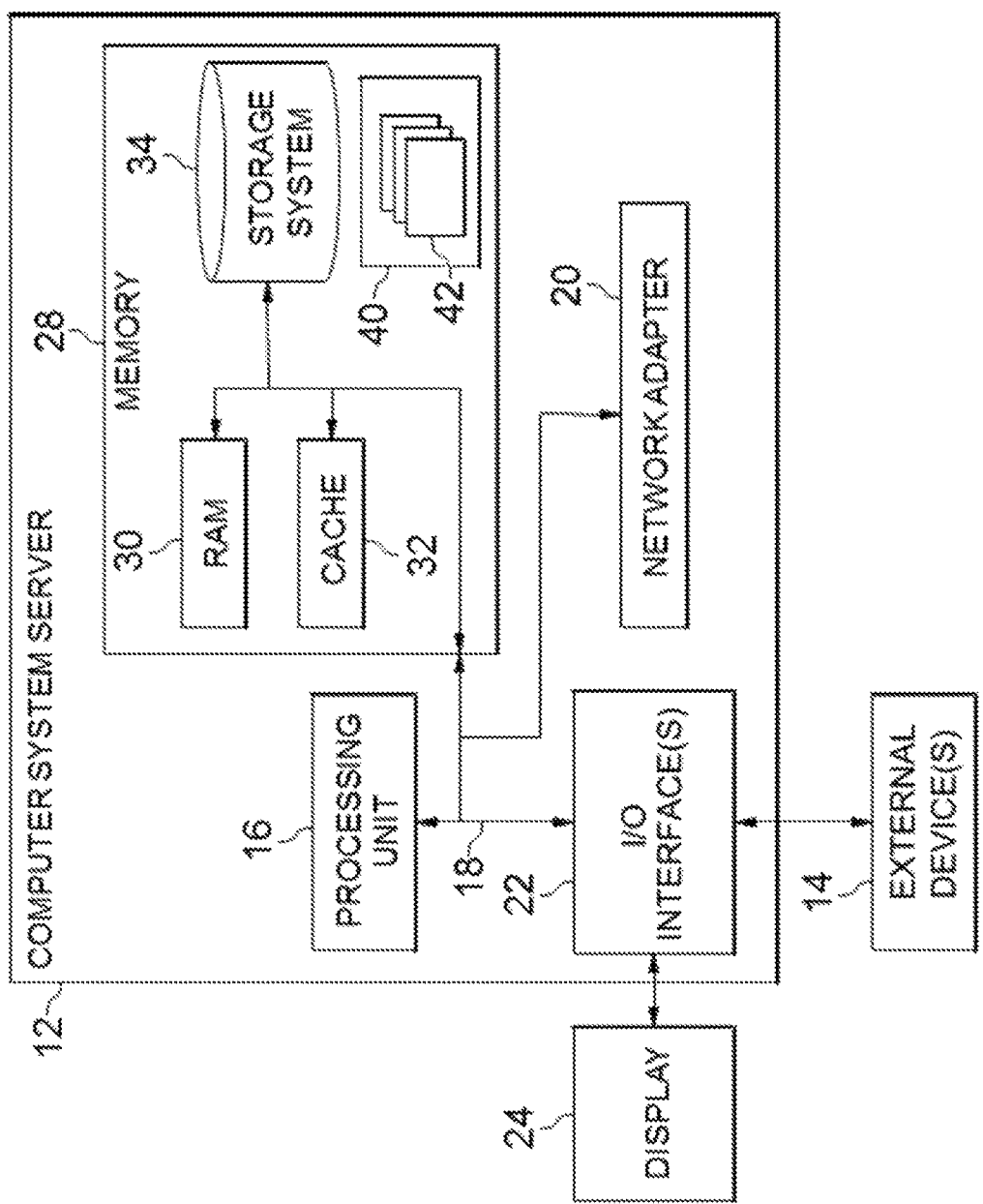
FIG. 2 depicts a cloud computing node according to an embodiment of the present invention.

Referring also now to FIG. 2, one or more computers of a computer system 12 according to an embodiment of the present invention can include a memory 28 having instructions stored in a storage system to perform the steps of FIG. 1.

As will described/illustrated in more detail below, one or more embodiments of the present invention may be implemented in a cloud environment (see e.g., FIGS. 2-4). It is nonetheless understood that the present invention can be implemented outside of the cloud environment.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 2 depicts a an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in cloud computing environments (see e.g., FIG. 3) where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 generally carry out the functions and/or methodologies of embodiments of the invention as described herein.

Computer system/server 12 may also communicate with one or more external devices 14 such as a keyboard, a pointing circuit, a display 24, a camera, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
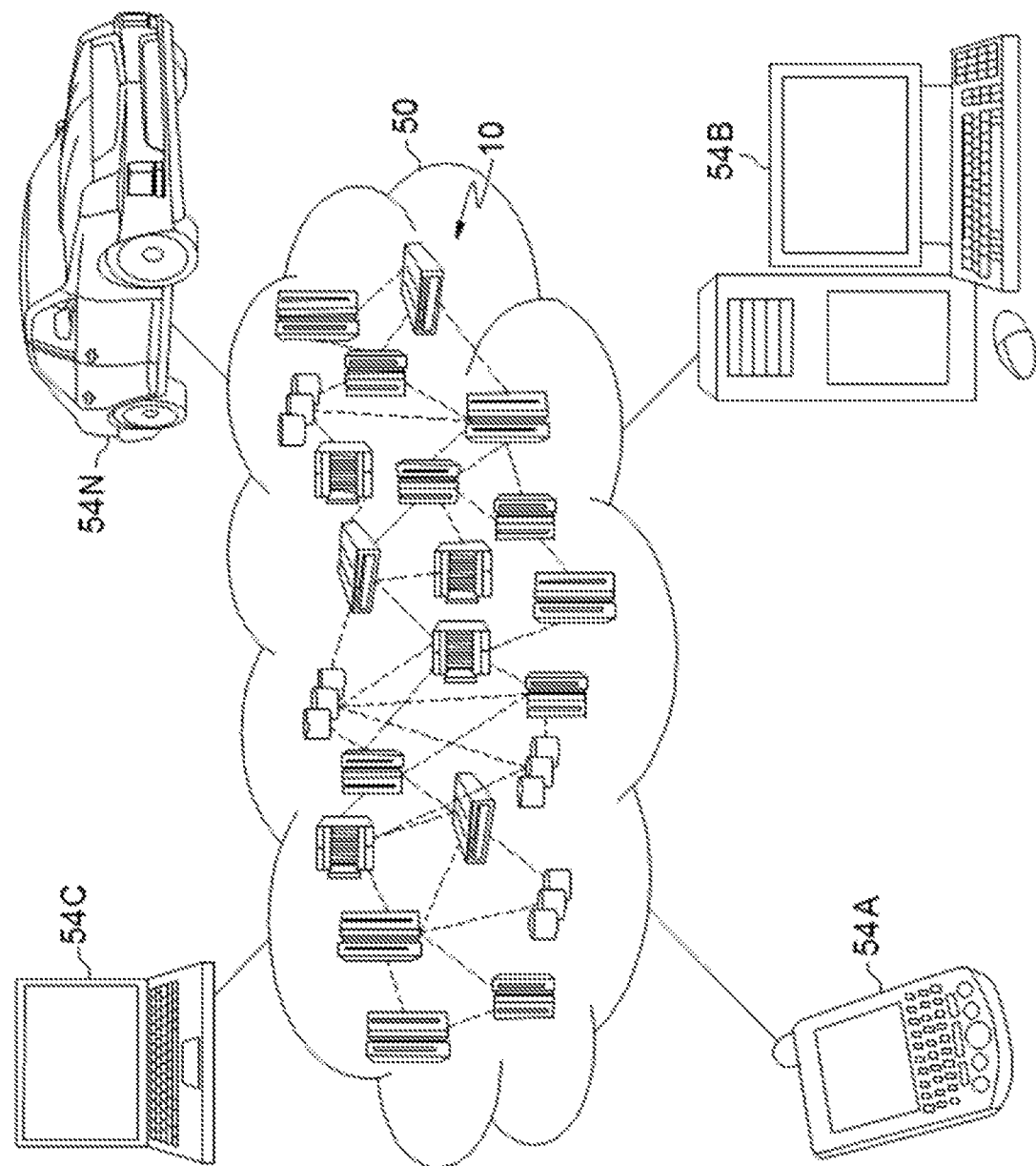
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 (e.g., computer system 12 (FIG. 3) with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
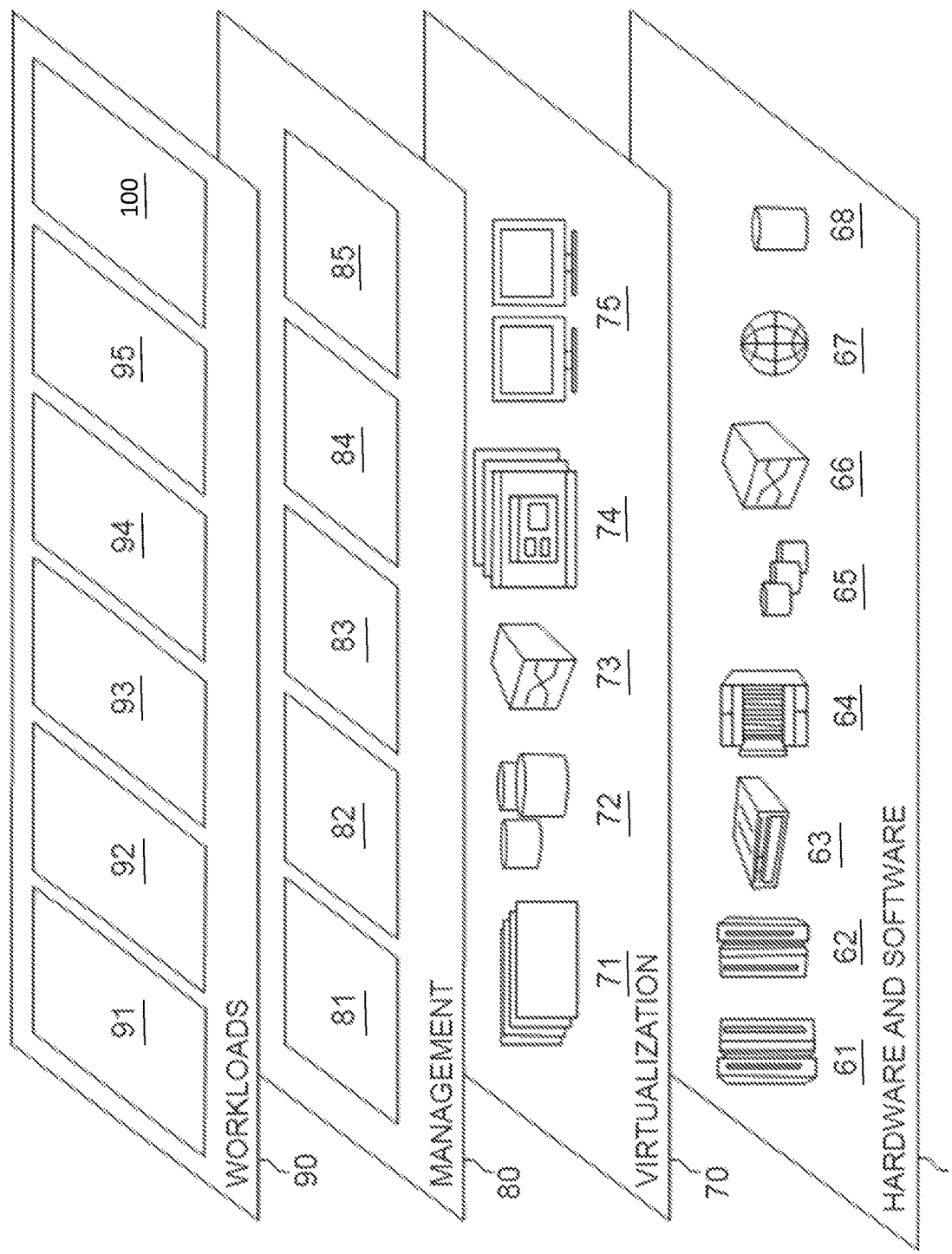
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the preferred picture-taking method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented preferred picture-taking method, the method comprising:
   identifying a photographic template from a plurality of templates based on a plurality of factors;
   matching a feature of a current photographic scene of a picture to be taken with a template feature of a photographic template determined to be a closest match; and
   providing a set of instructions including directional movement instructions to both of a photographer and a subject in the picture to be taken and a set of instructions including pose change instructions to the subject in the picture to be taken to adjust the feature of the current photographic scene such that a feature of the subject of the current photographic scene most closely matches the template feature of the photographic template,
   wherein the providing provides the set of instructions by:
      analyzing a two-dimensional image in the photographic template and the current photographic scene in a user camera;
      calculating a difference between the template feature of the image in the photographic template and the feature of the current photographic scene; and
      generating a position adjustment action and an orientation adjustment action in three-dimensional space as the set of instructions to adjust the feature of the current photographic scene to match the template feature,
   wherein elements of the current photographic scene other than the feature of the subject of the current photographic scene are different than elements of the photographic template,
   wherein the plurality of factors for identifying the photographic template comprises each of:
   a composition of photographs in a user database;
   a position and/or orientation of the photographs in the user database;
   a focus of the photographs in the user database;
   an aperture of the user camera used to take the photographs in the user database;
   a type of lens of the user camera;
   a shutter speed of the user camera; and
   a dimension and/or a size of the photographs in the user database,
   wherein the template feature is updated via learning from previous photographs in the user database and additional template features are generated, imported and/or exported from and to user cameras, other devices and media to automatically take the photograph when the subject in the user camera view matches one or more preferences embodied in a selected template of the additional learned template features, and
   wherein the plurality of factors for identifying the photographic template is collected from each of:
   photographs in a user database;
   liked and/or re-shared photographs on a social media platform;
   imported photographs from external sources; and
   unloaded photographs to the social media platform,
   wherein a closest photographic template is determined based on each of:
   a number of animate subjects in the photographic scene;
   a determination of an approximate distance to a background scenery and gauging whether the background scenery has a predetermined level of importance to the photographic scene;
   a similarity to the animate subjects and a background scenery in the photographic scene; and
   a facial orientation of each of the subjects; and
   wherein the set of instructions comprises each of:
   a set of instructions for the subject of the photograph to follow;
   an automatic control of the user camera to adjust the current photographic scene; and
   a set of instructions for the photographer to adjust a setting of the user camera.

2. The computer-implemented method of claim 1, wherein the instructions provide directions for a change of an angular bearing of the subject within the photographic scene to match the angular bearing of the subject within the photographic template.

3. The method of claim 1, embodied in a cloud-computing environment.

4. A computer program product for preferred picture-taking, the computer program product comprising a non-transitory computer readable storage medium having program instructions embodied therewith, the program instructions executable by a computer to cause the computer to perform:
   identifying a photographic template from a plurality of templates based on a plurality of factors;
   matching a feature of a current photographic scene of a picture to be taken with a template feature of a photographic template determined to be a closest match; and
   providing a set of instructions including directional movement instructions to both of a photographer and a subject in the picture to be taken and a set of instructions including pose change instructions to the subject in the picture to be taken to adjust the feature of the current photographic scene such that a feature of the subject of the current photographic scene most closely matches the template feature of the photographic template,
   wherein the providing provides the set of instructions by:
      analyzing a two-dimensional image in the photographic template and the current photographic scene in a user camera;
      calculating a difference between the template feature of the image in the photographic template and the feature of the current photographic scene; and
      generating a position adjustment action and an orientation adjustment action in three-dimensional space as the set of instructions to adjust the feature of the current photographic scene to match the template feature,
   wherein elements of the current photographic scene other than the feature of the subject of the current photographic scene are different than elements of the photographic template,
   wherein the plurality of factors for identifying the photographic template comprises each of:
   a composition of photographs in a user database;
   a position and/or orientation of the photographs in the user database;
   a focus of the photographs in the user database;
   an aperture of the user camera used to take the photographs in the user database;
   a type of lens of the user camera;
   a shutter speed of the user camera; and a dimension and/or a size of the photographs in the user database,
wherein the template feature is updated via learning from previous photographs in the user database and additional template features are generated, imported and/or exported from and to user cameras, other devices and media to automatically take the photograph when the subject in the user camera view matches one or more preferences embodied in a selected template of the additional learned template features, and
wherein the plurality of factors for identifying the photographic template is collected from each of:
photographs in a user database;
liked and/or re-shared photographs on a social media platform;
imported photographs from external sources; and
uploaded photographs to the social media platform,
wherein a closest photographic template is determined based on each of:
a number of animate subjects in the photographic scene;
a determination of an approximate distance to a background scenery and gauging whether the background scenery has a predetermined level of importance to the photographic scene;
a similarity to the animate subjects and a background scenery in the photographic scene; and
a facial orientation of each of the subjects, and
wherein the set of instructions comprises each of:
a set of instructions for the subject of the photograph to follow;
an automatic control of the user camera to adjust the current photographic scene; and
a set of instructions for the photographer to adjust a setting of the user camera.

5. The computer program product of claim 4, wherein the instructions provide directions for a change of an angular bearing of the subject within the photographic scene to match the angular bearing of the subject within the photographic template.

6. A preferred picture-taking system, the system comprising:
a processor; and
a memory operably coupled to the processor, the memory storing instructions to cause the processor to perform:
identifying a photographic template from a plurality of templates template based on a plurality of factors;
matching a feature of a current photographic scene of a picture to be taken with a template feature of a photographic template determined to be a closest match; and
providing a set of instructions including directional movement instructions to both of a photographer and a subject in the picture to be taken and a set of instructions including pose change instructions to the subject in the picture to be taken to adjust the feature of the current photographic scene such that a feature of the subject of the current photographic scene most closely matches the template feature of the photographic template,
wherein the providing provides the set of instructions by:
analyzing a two-dimensional image in the photographic template and the current photographic scene in a user camera;
calculating a difference between the template feature of the image in the photographic template and the feature of the current photographic scene; and
generating a position adjustment action and an orientation adjustment action in three-dimensional space as the set of instructions to adjust the feature of the current photographic scene to match the template feature,
wherein elements of the current photographic scene other than the feature of the subject of the current photographic scene are different than elements of the photographic template,
wherein the plurality of factors for identifying the photographic template comprises each of:
a composition of photographs in a user database;
a position and/or orientation of the photographs in the user database;
a focus of the photographs in the user database;
an aperture of the user camera used to take the photographs in the user database;
a type of lens of the user camera;
a shutter speed of the user camera; and
a dimension and/or a size of the photographs in the user database,
wherein the template feature is updated via learning from previous photographs in the user database and additional template features are generated, imported and/or exported from and to user cameras, other devices and media to automatically take the photograph when the subject in the user camera view matches one or more preferences embodied in a selected template of the additional learned template features, and
wherein the plurality of factors for identifying the photographic template is collected from each of:
photographs in a user database;
liked and/or re-shared photographs on a social media platform;
imported photographs from external sources; and
uploaded photographs to the social media platform,
wherein a closest photographic template is determined based on each of:
a number of animate subjects in the photographic scene;
a determination of an approximate distance to a background scenery and gauging whether the background scenery has a predetermined level of importance to the photographic scene;
a similarity to the animate subjects and a background scenery in the photographic scene; and
a facial orientation of each of the subjects, and
wherein the set of instructions comprises each of:
a set of instructions for the subject of the photograph to follow;
an automatic control of the user camera to adjust the current photographic scene; and
a set of instructions for the photographer to adjust a setting of the user camera.

7. The system of claim 6, wherein the instructions provide directions for a change of an angular bearing of the subject within the photographic scene to match the angular bearing of the subject within the photographic template.

8. The system of claim 6, embodied in a cloud-computing environment.

* * * * *